W. M. PESTEL.
FLASH POINT TESTING INSTRUMENT.
APPLICATION FILED SEPT 10, 1917. RENEWED JUNE 23, 1920.
1,364,517.
Patented Jan. 4, 1921.
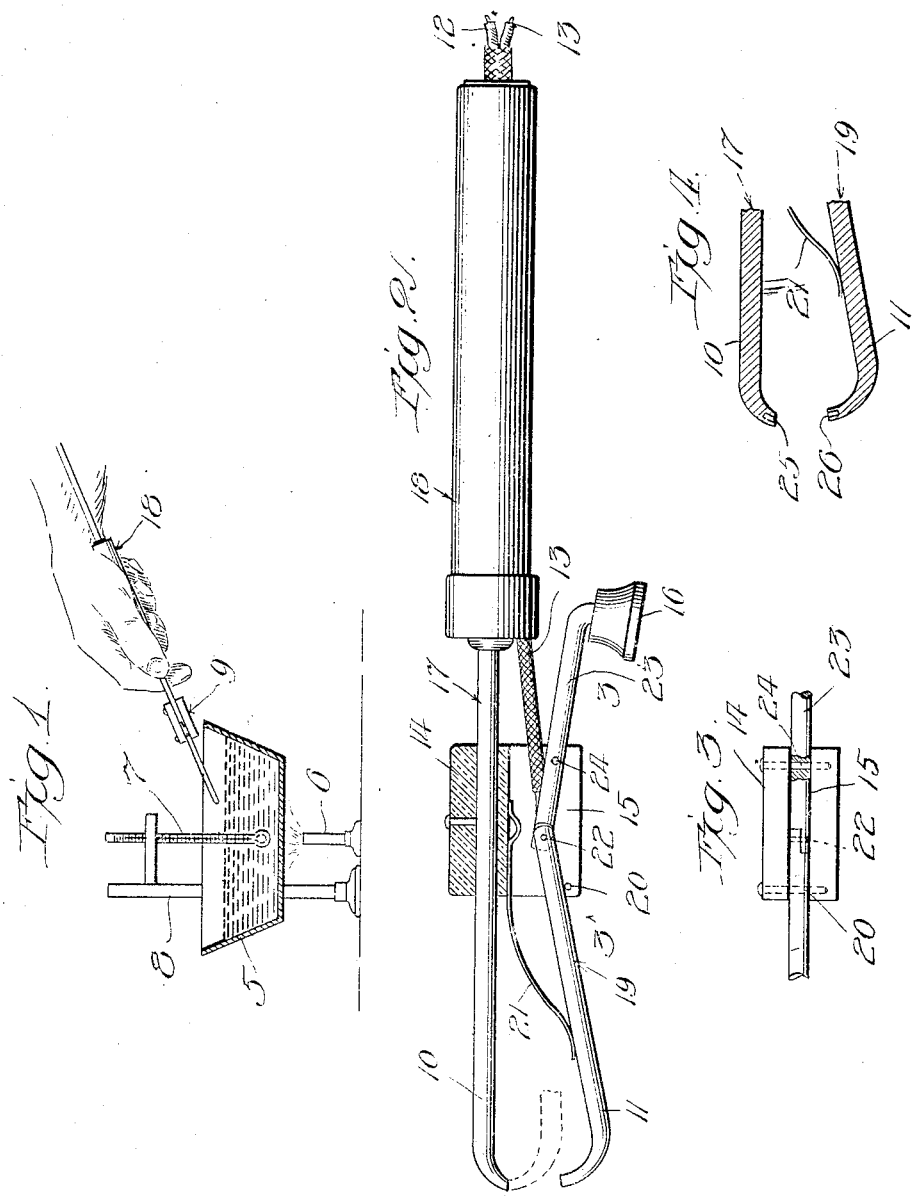

UNITED STATES PATENT OFFICE.

WILLIAM M. PESTEL, OF CHICAGO, ILLINOIS, ASSIGNOR TO SCHAAR & COMPANY, OF CHICAGO, ILLINOIS, A CORPORATION OF ILLINOIS.

FLASH-POINT-TESTING INSTRUMENT.

1,364,517.  Specification of Letters Patent.  Patented Jan. 4, 1921.

Application filed September 10, 1917, Serial No. 190,543. Renewed June 23, 1920. Serial No. 391,160.

*To all whom it may concern:*

Be it known that I, WILLIAM M. PESTEL, a citizen of the United States, residing at Chicago, county of Cook, and State of Illinois, have invented certain new and useful Improvements in Flash-Point-Testing Instruments, of which the following is a specification.

The present invention has to do with an instrument for testing the flash points and the burning points of oils and the like. Such oils as kerosene, gasolene, naphtha, etc., contain volatile constituents which are highly inflammable. These constituents come off or evaporate at different temperatures. Since they are inflammable, it is desirable to know the temperatures at which the inflammable vapors will flash and also the temperatures at which they will commence burning.

The determination of these temperatures is very important and involves the use of some means or arrangement for igniting the vapors as soon as the sufficiently high temperature has been reached. The present invention has to do with a device for igniting the vapors, so that the fact of their ignition can be ascertained at the same time that the temperature is reached. The use of the electric spark for this purpose has been attempted in the past, but it has been found to be unsatisfactory for various reasons. I have discovered the fact that the use of the electric arc for this purpose is very desirable, because thereby it is possible to concentrate the heat at the exact point desired and is also possible to control the instant and position of generation of the heat. Therefore, one of the features of the present invention has to do generally with the use of the electric arc for the purpose of testing the flash and vapor points of the oil, and also has to do with the provision of means for generating or creating the arc at the exact point desired for this purpose.

I have, however, discovered the fact that the life of the contact points used in generating or creating the arc is apt to be somewhat limited. After a certain length of time these contact points become pitted or oxidized by the burning of the arc.

I have discovered the fact that, if oil be applied to the contact points as they are successively brought together and separated, the pitting and oxidizing of the points will be largely, if not entirely, eliminated, so that their life will thereby very greatly increase, besides improving the accuracy and certainty of the test itself. When the operator has under his control a device or implement which will very certainly bring about the ignition of the vapors, he is able to more accurately and certainly determine the flash and burning points, and, therefore, this feature of the invention which will very greatly improve the generation of the igniting arc will be found to be of great value and usefulness in the art.

Certain objects and uses of the invention will appear from a detailed description of the same which consists in the features of the construction and combinations of parts hereinafter described and claimed.

Referring to the drawings:

Figure 1 shows a convenient manner of application and use of the device of the present invention. In this figure there is illustrated a vessel or beaker containing the oil undergoing test, a thermometer depending into the oil, and the operator using the test instrument;

Fig. 2 shows on enlarged scale a plan or face view of the instrument in open position, a portion of the instrument being cut away so as to better reveal the construction. In this figure the dotted lines show the position assumed by the contactor jaw when the same is in closed position;

Fig. 3 shows a fragmentary detail view taken on the line 3—3 of Fig. 2, looking in the direction of the arrows; and Fig. 4 shows in cross section the tip or end portions of the contact jaws.

In Fig. 1, the beaker or vessel containing the oil under test is designated by the numeral 5. It is supported in any suitable manner and a Bunsen burner or other heater 6 serves to heat the oil and slowly raise its temperature. A thermometer 7 depends into the oil and indicates its temperature, said thermometer being carried by a bracket or stand 8. The test instrument shown in the drawing is designated in its entirety by the numeral 9. It is held by the operator with its contact tips close to the surface of the oil where they will draw the arc to ignite the vapors as they rise from the surface of the oil.

The construction of this test instrument is shown in detail in Figs. 2, 3, and 4. It comprises the jaws 10 and 11 which are movably mounted with respect to each other. These jaws are connected into an electric circuit including the wires 12 and 13, so that when the jaws are brought together, and then allowed to separate, an arc of suitable intensity will be drawn between them.

One of the jaws is fixedly mounted within an insulating block 14 having the slotted opening or recess 15. The other jaw is pivotally mounted within said slotted recess, so that it can be worked back and forth by the thumb of the operator by means of an insulating button or the like 16. The jaw 10 conveniently constitutes the end portion of a stiff rod or the like 17 which is rigidly connected to a handle member 18. The jaw 11 conveniently constitutes the tip portion of a rod 19 resting beneath the pin 20 which extends across the slot 15 and limits the outward movement of said rod 19 under the influence of a leaf spring 21. The inner end of the rod 19 is pivoted at the point 22 to one end of a rod 23, the other end of which rod carries the button 16. The rod 23 is pivoted within the slot 15 by a pin 24. Consequently, when the button is depressed, the rod 19 will be rocked on the pin 20 to carry its tip into the dotted line position shown in Fig. 2.

Examination of Fig. 4 will reveal the recesses or pockets 25 and 26 in the tip contacting ends of the tips 10 and 11. During the normal operation of the device, the tips 10 and 11 are supported close to the surface of the oil into which they may be dipped from time to time so as to throw the oil into the pockets 25 and 26, thus keeping them oiled at all times as the tips are worked back and forth. As previously stated, I have discovered the fact that the application of oil to the contacting points as they are successively brought together and separated will serve, to a very large degree, if not entirely, to eliminate the pitting or burning of the contacting points, so that they will at all times remain in practically perfect condition for drawing the arc. The recesses or pockets 25 and 26 will serve to insure the presence of the oil on the tips for this purpose. I wish to point out the fact that many other forms of construction might be adopted for insuring a constant application of oil to the tips, as, for example, the use of hollow tubes or rods within which oil would accumulate instead of within short recesses, such as are illustrated. Any such expedient, however, is clearly within the scope of the present invention, and, therefore, I contemplate the use of any and all such arrangements, and in fact any arrangement which will insure the application of oil to the tips for this purpose. The wires 12 and 13 may be connected to the rods or tips in any suitable manner.

I wish also to point out the fact that, as far as I am aware, the use of the electric arc for the purpose of ascertaining the flash points and burning points of oil is new, regardless of the construction of the mechanism used for producing the arc. I, therefore, contemplate, within the scope of my invention, the process of testing the oil for its flash or burning points, or both, by the use of the electric arc, and also any appropriate apparatus or mechanism generating such arc.

While I have herein shown and described only a single embodiment of the features of my invention, still it will be understood that I do not limit myself to the said embodiment, except as I may do so in the claims.

I claim:

1. In a device of the class described, the combination of a pair of jaws, electrical connections for delivering current of opposite polarity to said jaws, and means for moving said jaws into electrical contact with each other, the jaws being provided in their abutting surfaces with recesses for the accommodation of oil, substantially as described.

2. In a device of the class described, the combination of a pair of arc establishing terminals, means for bringing said terminals into engagement with each other, and thereafter separating them for the purpose of establishing an arc, there being suitable openings for the accommodation of oil in the abutting faces of the terminals, substantially as described.

3. In a device of the class described, the combination of a pair of terminals having in their abutting faces openings for the delivery of oil for the purpose specified, and means for establishing and breaking contact between said abutting faces, substantially as described.

WILLIAM M. PESTEL.